Figure 2:
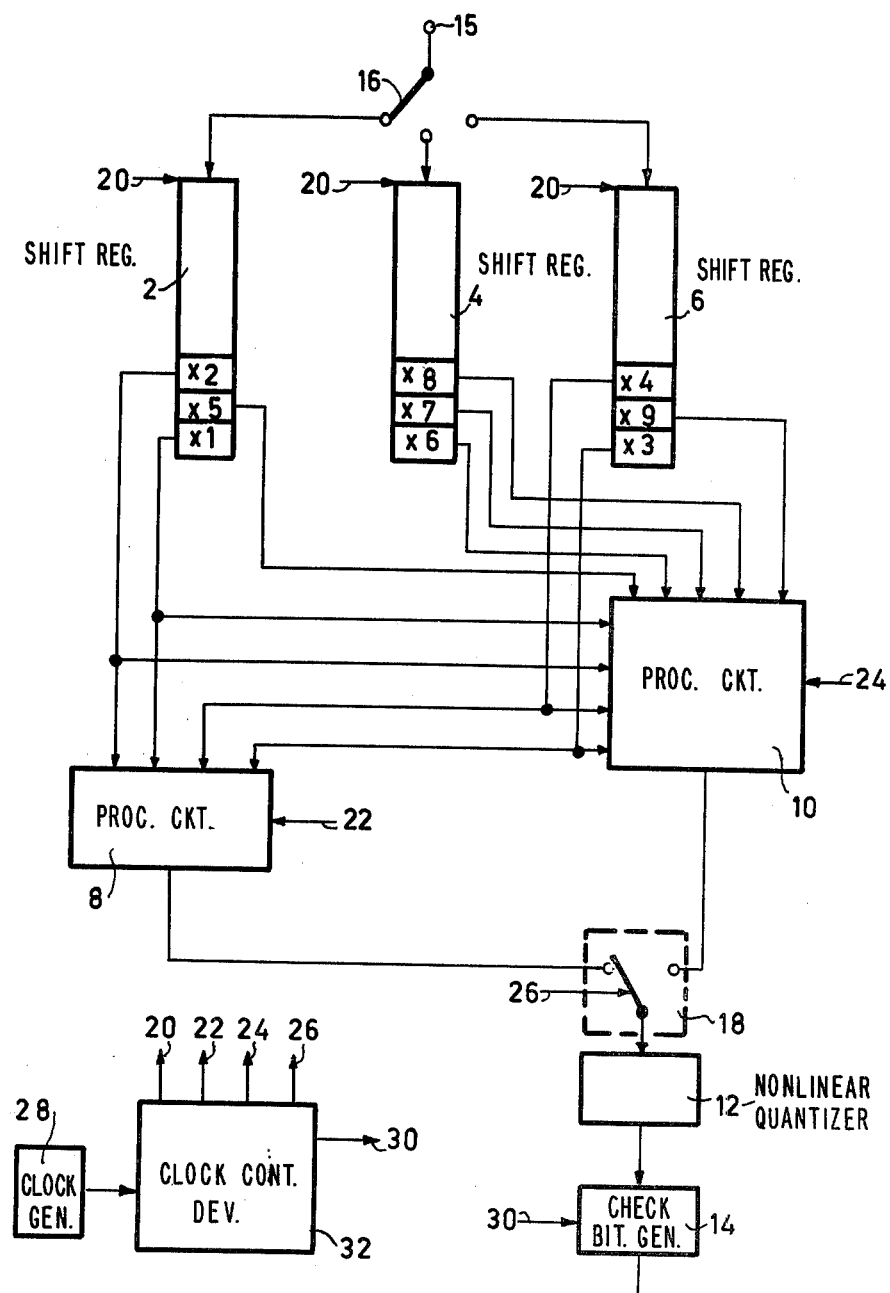

United States Patent [19]

Lux

[11] 4,155,097

[45] May 15, 1979

[54] METHOD AND ARRANGEMENT FOR THE REDUNDANCY-REDUCING CODING OF PICTURES

[75] Inventor: Peter Lux, Hamburg, Fed. Rep. of Germany

[73] Assignee: U.S. Philips Corporation, New York, N.Y.

[21] Appl. No.: 825,665

[22] Filed: Aug. 18, 1977

[30] Foreign Application Priority Data

Sep. 7, 1976 [DE] Fed. Rep. of Germany ....... 2640157

[51] Int. Cl.² .............................................. H04N 7/12
[52] U.S. Cl. .................................... 358/135; 358/138; 358/260
[58] Field of Search ................. 358/133, 135, 138, 260

[56] References Cited

U.S. PATENT DOCUMENTS

| | | | |
|---|---|---|---|
| 2,921,124 | 1/1960 | Graham | 358/138 |
| 3,051,778 | 8/1962 | Graham | 358/133 |
| 3,679,821 | 7/1972 | Schroeder | 358/133 |
| 3,937,871 | 2/1976 | Robinson | 358/260 |
| 3,980,809 | 9/1976 | Cook | 358/260 |

OTHER PUBLICATIONS

H. Kobayashi, "Adaptive Data Compression Scheme", 9-71, IBM Tech. Discl. Bulletin, vol. 14, No. 4, pp. 1305-1311.

*Primary Examiner*—Robert L. Richardson
*Assistant Examiner*—Edward L. Coles
*Attorney, Agent, or Firm*—Thomas A. Briody; William J. Streeter; Henry I. Steckler

[57] ABSTRACT

With known methods for predictive decorrelation it always applies only to one or more previously scanned elements of the same picture line. A disturbance for a decorrelated value leads on reconstruction to a "falsification" of a longer picture sequence. A protection from errors by check bits for each decorrelated element would considerably increase the redundancy. In accordance with the invention the picture to be scanned is divided into sub-pictures and in each sub-picture some substantially uniformly distributed elements are decorrelated as supporting positions and transmitted faultlessly, the remaining intermediate elements being decorrelated only with respect to the supporting positions of the sub-picture and transmitted without protection against errors. Consequently, the increase in redundancy by means of check bits is limited and an error with a transformed value of an intermediate element disturbs on reconstruction only that intermediate element itself and not the surrounding elements. With an arrangement for the decorrelation a number of picture lines corresponding to the number of lines a sub-picture comprises is intermediately stored and two processing circuits are connected to each time the last stages of these shift registers, one of these processing circuits decorrelating the supporting positions and the other one the intermediate elements.

10 Claims, 9 Drawing Figures

Fig.1a

Fig.1b $$\begin{pmatrix} 1 & -g & -g & -\xi \\ -g & 1 & -\xi & -g \\ -g & -\xi & 1 & -g \\ -\xi & -g & -g & 1 \end{pmatrix}$$

METHOD AND ARRANGEMENT FOR THE REDUNDANCY-REDUCING CODING OF PICTURES

The invention relates to a method for the redundancy-reducing coding of the values of the picture elements of pictures which are scanned line-by-line and divided into a matrix of lines and picture elements wherein, at least for a part of the picture elements, the difference value between the actual value of a picture element and a predictable value obtained from the values of other picture elements is provided for transmission, as well as to an arrangement for performing the method.

Such a method is diclosed in German published patent application No. 23 12 526 and is used to reduce for each picture element when transmitting or storing pictures, the information to be transmitted and stored without "falsifying" the picture contents. This prior art method of predictable decorrelation has the drawback that a disturbance of only one single value of the stored or transmitted values respectively also disturbs or falsifies respectively the following picture element as these values indicate differences only and no absolute values. It is known, however, to provide code words with check bits to enable the identification and correction respectively of any errors; this, however, partly cancels the redundancy reduction obtained by the coding.

It is an object of the invention to provide a method wherein the occurrence of errors in a coded picture value changes this picture value only, and wherein the efficiency of the redundance reduction is affected to a limited extent only. In accordance with the invention this is accomplished by a method which is characterized in that the picture matrix is divided into adjacent, equally large, square sub-pictures, in that the values of the picture elements of the picture lines which are covered by a row of sub-pictures are intermediately stored in that in each sub-picture a number of picture elements which are distributed substantially uniformly over the sub-picture are transformed as supporting positions for themselves or are decorrelated by predictive difference formation, in that for each of the remaining intermediate elements a prediction value is determined only from supporting positions of the associated sub-picture and in that the difference value between this value and the actual value of the intermediate element is formed, in that the transformed values and the difference values respectively are applied to a quantizer and that check characters are added at least to the code word and the code words respectively for the supporting positions.

The division into sub-pictures and the decorrelation of picture elements, that is to say of the supporting positions and the intermediate elements, taking constantly different values into account, result in an improved decorrelation compared with the known method which only utilizes one or more immediately subsequent picture elements of the same line for the decorrelation. In addition, the division into supporting positions and intermediate elements offers the possibility to reliably protect the supporting positions by means of check bits which are short relative to the total codeword length of a sub-picture, so that the redundancy does not become much poorer. An error in a codeword for a supporting position can then be identified and corrected with certainty, so that no unnoticed error can be produced in the reconstructed picture, whereas an error in the codeword for an intermediate element can only affect this intermediate element on reconstruction. Consequently, fairly great, unnoticed errors which might have far-reaching consequences in certain pictures, for example X-ray photographs where "falcification" of a rather large picture area may lead to a faulty diagnosis are therefore substantially impossible.

The supporting positions in the sub-picture have been arranged in an efficient manner such that each intermediate element is located in the horizontal, vertical or diagonal direction between two supporting positions of a sub-picture. Then the distance between the individual supporting positions is so small that an effective mutual decorrelation can be effected and the decorrelation of intermediate values from the supporting positions is also still efficient.

An arrangement for performing the method according to the invention is characterized in that a number of shift registers, equal to the number of lines of the given sub-pictures is provided, each of which stores the values of all picture elements of one picture line, in that a first processing circuit for producing the transformed values and the difference values of the supporting positions respectively is connected to the outputs of the stages containing the values of the supporting positions of the sub-pictures which were stored last in the shift registers, in that furthermore a second processing circuit is connected to these outputs whose further inputs are connected to the stages of the shift registers containing the values of the remaining picture elements of the last sub-picture, in that the outputs of the processing circuits are alternatingly connected through a switch-over switch and a quantizing circuit to a check character generator which produces check characters at least from the code words indicating the supporting positions and adds these check characters to these code words and in that a clock-pulse control device supplies after processing of all picture elements of a sub-picture a number of shift clock pulses corresponding to the number of lines of the sub-picture to the shift clock-pulse input.

Further embodiments of the invention are characterized in the other claims.

Figure 3:
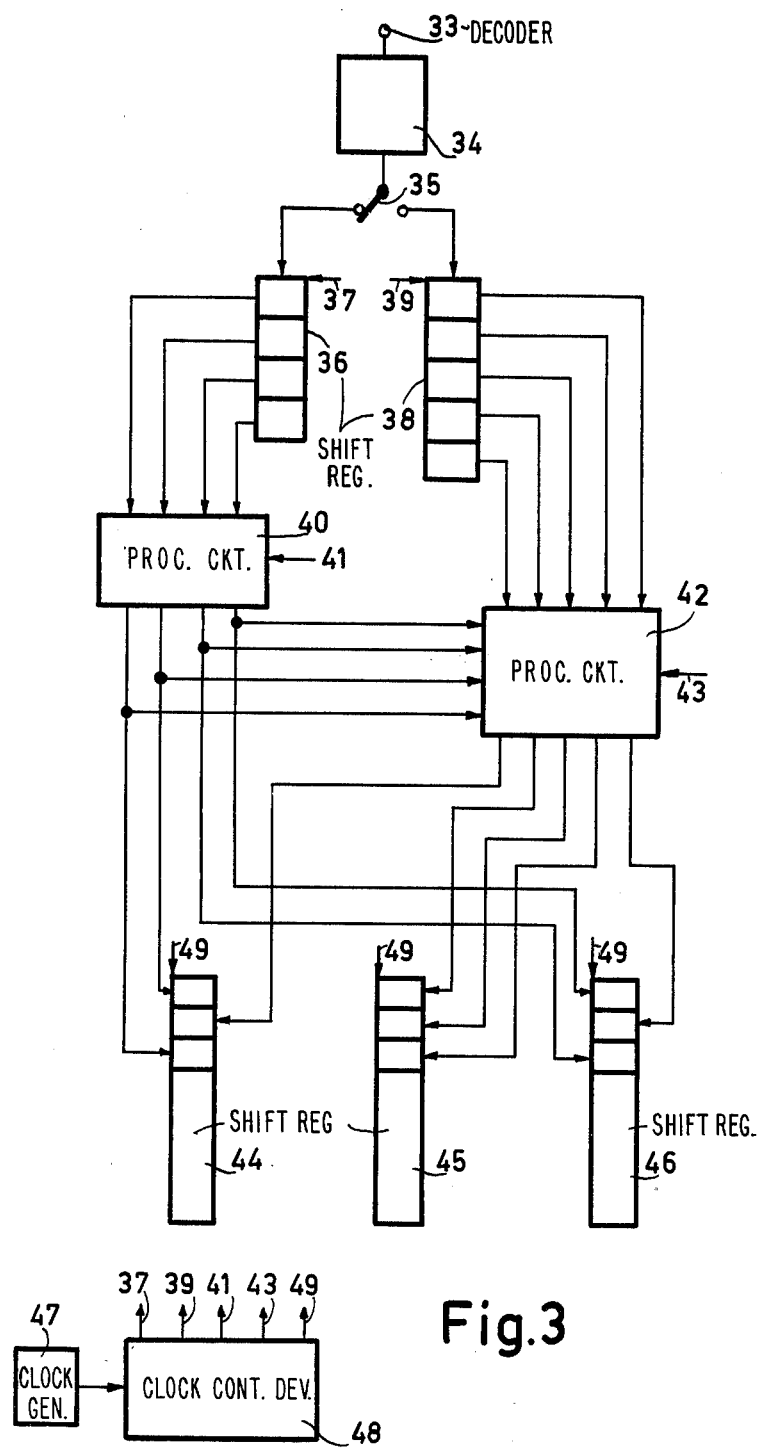
Figures 4A, 4B:
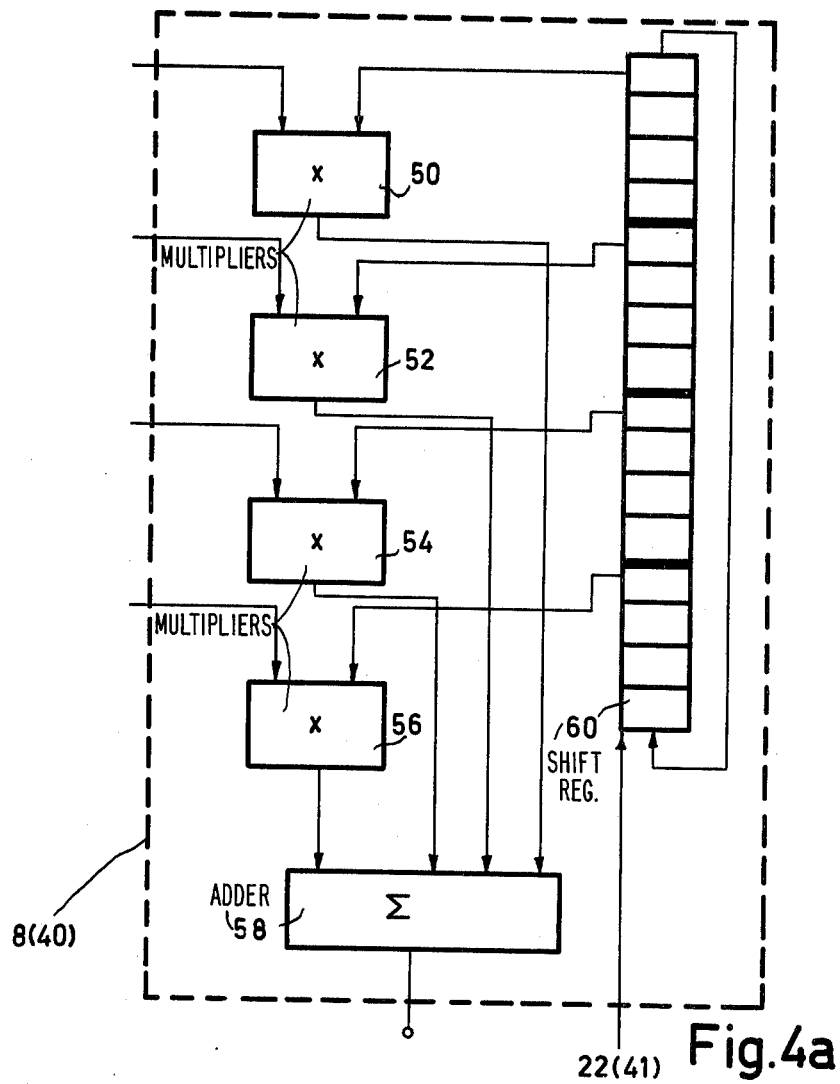
Figures 5A, 5B:
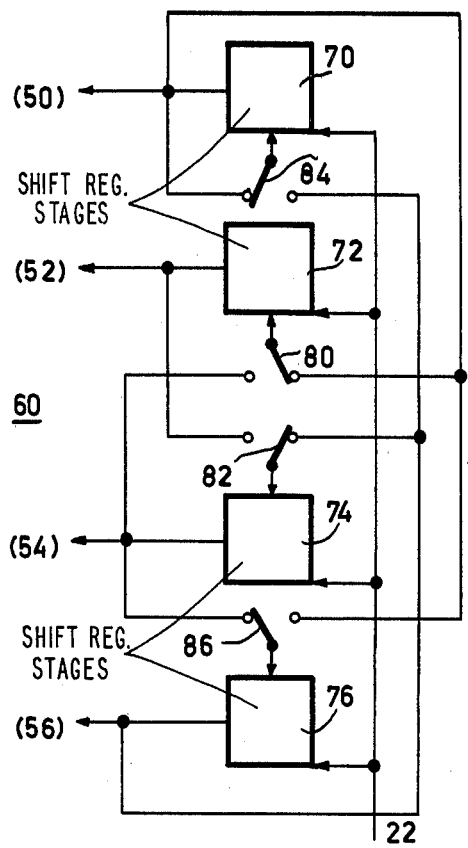
Figure 6:
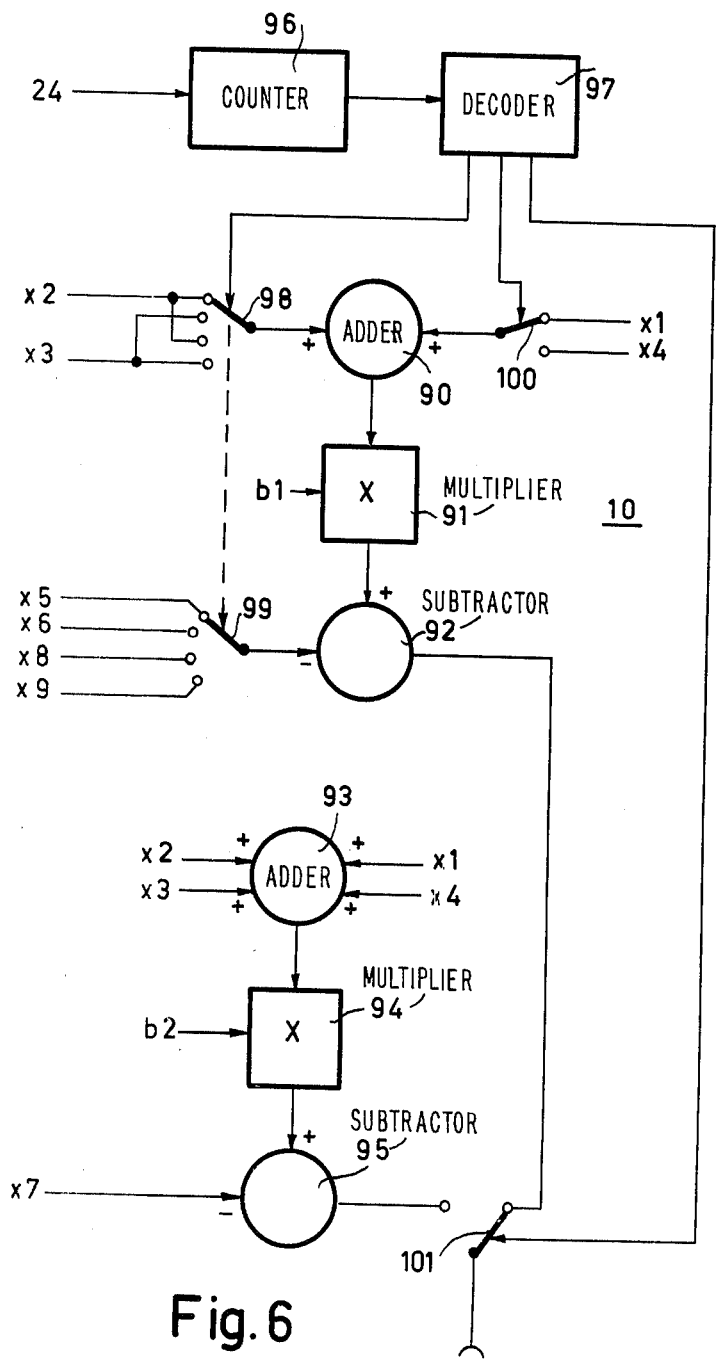

Embodiments of the invention will be explained in greater detail with reference to the drawings in which:

FIGS. 1a and 1b show two different sub-picture formats with a sub-division into supporting positions and intermediate elements, FIG. 2 shows a block diagram of an embodiment of the arrangement according to the invention, FIG. 3 shows a block diagram of a device for converting or decoding the pictures coded in accordance with the invention, FIG. 4a shows a block diagramm of a processing circuit suitable for use in an arrangement as shown in FIG. 2 for coding the supporting positions and FIG. 4b an associated coefficient matrix, FIG. 5a shows a further embodiment of the processing circuit and FIG. 5b an associated coefficients matrix, and FIG. 6 shows a device for decorrelating or coding the intermediate elements.

The size of the sub-pictures into which the picture to be scanned is divided, forms a given compromise. A large sub-picture is advantageous for a proper decorrelation but then the costs and the trouble of decorrelation increase considerably. FIG. 1a shows a portion of a picture having a sub-picture size or format of $3 \times 3$ picture elements. The elements at the corners which are indicated by means of crosses and small circles and numbered from 1 to 4 in the first sub-picture and indicated in the description by x1, x2, x3, and x4 represent the supporting positions. The picture elements which are indicated by crosses only and numbered from 5 to 9 in the first sub-picture and indicated in the description by x5, x6, x7, x8 and x9 represent the intermediate elements. FIG. 1a shows that there is only one intermediate element between any two supporting elements of a sub-picture so that on the one hand an adequate correlation between the supporting positions can still be properly decorrelated relative to one another without using other picture elements, and that on the other hand, at least two supporting positions are adjacent to each intermediate element in the horizontal, vertical or diagonal direction so that the decorrelation of the intermediate elements by using supporting positions only is also adequately possible.

FIG. 1b shows an example of a division into sub-pictures having 5×5 picture elements. Also here the supporting positions are indicated by crosses and circles and the intermediate elements by crosses only. The supporting positions are again located in the four corners of the sub-picture, besides that in the centre of the edge row and edge column respectively and in the centre of the sub-picture. When decorrelating the corner supporting positions it will be sufficient to use the three supporting positions which are adjacent in the horizontal, vertical and diagonal direction. The central edge supporting positions can be decorrelated relative to the three supporting positions of this sub-picture adjacent to it in the vertical and the horizontal direction, whereas for the supporting position in the centre of the sub-picture the four supporting positions surrounding it in the horizontal and vertical direction can be taken into account. Also here each intermediate element is flanked by at least two supporting positions. From the explanation of the decorrelation of the supporting positions it can already be deduced that it can only be performed at a considerably greater cost and trouble than in the sub-picture shown in FIG. 1a. On the other hand the decorrelation is, however, more effective as a larger surrounding area can be taken into account for a number of supporting positions. In addition, the ratio between supporting positions and intermediate elements is more favourable, that is to say smaller, so that when adding check bits to the code words of the supporting positions the redundancy becomes a little less poor than with the sub-pictures according to FIG. 1a. For simplicity however, a picture coding by means of a division into sub-pictures in accordance with FIG. 1a will be explained below.

The decorrelation of the supporting positions x1 to x4 can be performed in various manner, for example by considering these four supporting positions as one picture and by applying one of the known methods of picture coding to them (see, for example, Proceedings of the IEEE, Vol. 60, No. July 7, 1972, pages 809 to 820). Another possibility is the predictable decorrelation, the principle of which is indicated in the above-mentioned German published patent application No. 23 12 526. In this decorrelation the difference between the value of a supporting position and the predictable value obtained from the values of the other three supporting positions is formed for this supporting position and this is successively performed for all the supporting positions of a sub-picture. Producing the difference values can also be expressed mathematically as follows:

$$[A] \cdot [x] = [x'] \quad (1)$$

Herein [A] is the matrix of the prediction coefficients which are determined in such a way that the average square error is minimized. Herein the prediction coefficients depend on the picture content; however, with only a small reduction in the quality of the prediction, it is possible to start from prediction coefficients which are the same for different pictures if these pictures have in principle the same content, such as this is, for example, the case with X-ray photographs. In addition, [x] and [x'] are the supporting positions arranged in a column. If the correlation of picture element values in the horizontal and the vertical direction as well as in the direction of the main and auxiliary diagonals is assumed to be the same, a Toeplitz-matrix is obtained which is shown in FIG. 5b. Therein the value 1 always takes the value of the picture element itself into account, whilst the sum of the other coefficients having the correct sign takes the negative prediction value into account so that the proper difference value is directly obtained by multiplying and adding the products. A particularly simple form is obtained if the same correlation in the horizontal and the vertical direction ($-\rho$ in FIG. 5b) as well as in the diagonal direction ($-\xi$ in FIG. 5b) is chosen, the matrix having only one single coefficient value next to the value 1, so that a simple implementation is possible. A definite drawback of forming the difference is in principle that the absolute value, that is to say in the relevant case the average basic luminance of the sub-picture is lost when the sum of the prediction coefficients is equal to 1. If now the sum of the coefficients deviates from the value 1 the absolute value is indeed still present but then the redundancy reduction becomes poorer, that is to say the redundancy is increased again. This increase is the smaller according as the sum of the coefficients comes nearer the value 1, but then multiplications with larger values are required on reconstruction so that a corresponding error of the average picture luminance is unavoidable. A better possibility consists in using the matrix shown in FIG. 4b instead of the matrix shown in FIG. 5b. Herein all the coefficients in the first matrix row have the value 1 or a smaller positive value, the most important condition being that all coefficients have the same positive value. The first derived value, that is to say the value derived in the matrix shown in FIG. 1a for the picture element x1 then forms no decorrelated value but the average value of the picture luminance of the supporting positions x1, x2, x3 and x4. The remaining values remain unchanged. Consequently, the derived values of the supporting positions give in their totality in the coded form indeed a longer code word, that is to say the redundancy reduction is not optimum, but this is compensated by the fact that then the absolute value is present. The redundancy reduction can, however, be improved by not transmitting the absolute value of the average picture luminance of each sub-picture but the differences relative to the corresponding value of the preceding sub-picture, as suggested in U.S. patent application Ser. No. 829,899, filed Sept. 1, 1977.

The difference values for the intermediate elements are determined in accordance with the following equations:

$$x'5 = b11 \cdot x1 + b12 \cdot x2 - x5$$

$$x'6 = b21 \cdot x1 + b22 \cdot x3 - x6$$

$$x'7 = b31 \cdot x1 + b32 \cdot x2 + b33 \cdot x3 + b34 \cdot x4 - x7$$

$$x'8 = b41 \cdot x2 + b42 \cdot x4 - x8$$

$$x'9 = b51 \cdot x3 + b52 \cdot x4 - x9 \qquad (2)$$

The prediction value of the picture element x5 is obtained from the supporting positions x1 and x2, the actual value of the intermediate element x5 being subtracted therefrom. The prediction value of the intermediate element x7 in the centre of the sub-picture is calculated from the four supporting positions. For the practical realisation the correlations in the horizontal and the vertical direction are here again assumed to be the same, so that the coefficients b11, b12, b21 and b22 and b41, b42, b51 and b52 are the same and, in a similar manner, the correlations in the diagonal direction are all assumed to be equal so that the coefficients b31, b32, b33 and b34 are also the same but in normal cases different from the other coefficients.

FIG. 2 shows an arrangement for performing the decorrelation. Three shift registers 2, 4 and 6 are present which each store the values of a picture line of the scanned picture. In view of the fact that the luminance values of each picture element is recoded after scanning by an analog-to-digital converter (not shown) into a number of bits, each stage of a shift-register 2, 4 and 6 has a corresponding number of storage stages which pass their contents on, for example in parallel with the corresponding storage stages of the adjacent shift register stage. For the customary line-by-line picture scanning the coded picture element values are applied to an input 15 and shifted successively into the shift resiter 2 through a switch-over switch 16 until a picture line has been fully scanned and stored whereafter the switch 16 is switched to the input of the shift register 4 and the values of the next picture line applied to the input 15 are entered into the shift register 4 etc. The length of the three shift registers 2, 4 and 6 is dimensioned such that each of them can just store the values of one picture line. Then, after the storage of three full picture lines the indicated values of the first sub-picture are present in the three last stages x1 to x9 of the three shift registers 2, 4 and 6 of FIG. 2, starting from the distribution shown in FIG. 1a. The outputs of the stages x1 to x4 of the shift registers 2 and 6 are connected to a processing circuit 8 in which the values, present in parallel, of these four supporting positions are processed by means of a coefficients matrix, that is to say the supporting position values are multiplied by four different sets of coefficients and the products of each multiplication are added. A possibility to implement the processing circuit 8 is described below (FIG. 4a) and, for simplicity, it should here be assumed, that the four difference values and derived values respectively of the supporting positions x1, x2, x3 and x4 of the first sub-picture appear one after the other at an output. With a processing circuit which produces these four values in parallel this can be achieved by means of a multiplexer disposed behind this processing circuit. The four values are applied in the position shown through a switch-over switch 18, which actually consists of a number of parallel switch-over switches for the bits of the derived values to a non-linear quantizing device 12 the output of which leads to a check-bit generator 14 which calculates check-bits from each quantized value separately or from all four values together and adds these bits to each value or to all four values respectively. The output 17 of the check-bit generator 14 is connected to a transmission path or a store respectively, not shown here.

The outputs of the shift registers 2 and 6 containing the values of the supporting positions x1, x2, x3 and x4 are furthermore connected to a second processing circuit 10 to which also the outputs of the other stages of the shift registers 2, 4 and 6, which contain the values of the intermediate elements x5, x6 ... x9 of the first sub-picture are connected. From the values of the supporting positions this processing circuit again supplies prediction values by means of multiplication and adding, and this is done for the intermediate elements, from each prediction value is then subtracted the actual value of the intermediate element, as shown in the equations (2). So this processing circuit 10 comprises multipliers, adders and a coefficient store. Also here it is assumed, that the difference values of the individual intermediate elements appear successively at the output, which can be accomplished in the same manner as for the processing circuit 8, possibly by a multiplexer. However, before the difference values are successively obtained, the switch 18 is switched-over by a signal at the output 26 to connect the output of the processing circuit 10 to the quantizer 12 and the check-bit generator 14. Then the difference values are applied one after the other through the switch-over switch 18 to the quantizer 12 whose output is indeed connected to the check-bit generator 14 but, in an efficient manner, no check-bits are calculated and added anymore relative to the values for the intermediate elements since a transmission error, as explained already, can only affect one single picture element.

After values of all intermediate elements of a sub-picture have been furnished the information is shifted over three positions in the shift registers 2, 4 and 5, so that the picture element values of the first sub-picture disappear and the picture element values of the second sub-picture are in the relevant last stages of the shift register. Now the cyle of processing steps can start again until the three picture lines, that is to say the sub-pictures superimposed thereon, have been fully processed.

This described procedure of the processing steps is controlled by a clock pulse control device 32 which distributes the pulses produced by a clock pulse generator 28 in the correct sequence over a number of outputs 20 to 30 which can be accomplished by means of a coding circuit. Firstly, four pulses are supplied at the output 22 which are supplied to the input, indicated by the same reference sign of the processing circuit 8 in order to successively supply the four derived supporting position values. At the same time signals are supplied through the output 30 and applied to the input, indicated by the same reference sign, of the check-bit generator 14 so that the latter determines check-bits from the codewords obtained by the quantizing device 12 for the supporting positions and adds them to these codewords. Thereafter a pulse appears at the outputs 26 which switches the switch 18 to the opposite position. Now five pulses follow at the output 24 which are applied to the input, indicated by the same reference sign, of the processing circuit 10 to supply the derived values for the intermediate elements. During this period of time the check-bit generator 14 is blocked by a corresponding signal at the output 30 so that the code words of the quantizing device 12 for the intermediate elements are not provided with check bits. Now three shift clock pulses are delivered at the output 20 which are applied to the shift clock pulse inputs, indicated by the same reference sign, of the shift registers 2, 4 and 6. Any additional pulses at the outputs 22 and 24 which may be necessary, depending on the chosen configuration of the processing circuits 8 and 10 and which will be explained further on may connect up with them or partially overlap the other pulses in the time. Producing such series of pulses can be easily performed, as known, by means of counting circuits. This cycle of processing steps is successively performed with all sub-pictures present in the shift registers 2, 4 and 6 until the picture lines have been processed and these shift registers are empty. In this connection it should be noted that the information appearing at the output of the shift registers on shifting the information in the shift registers 2, 4 and 6 may disappear as it need no longer be used.

Now the following three picture lines can be processed. With a randomly controllable scanning three picture lines are then scanned one after the other and entered again in the shift registers 2, 4 and 6. The first of the three picture lines may also be entered on processing the proceding three picture lines with the shift clock-pulses which shift the information in the shift registers 2, 4 and 6 on during this processing to make better use of the time. With a continuous scanning at a fixed rate, such as is generally the case with mechanical scanning devices, the shift registers 2, 4 and 6 must be provided in two-fold and periodically switched-over, each time three picture lines have been scanned, whilst coding the three picture lines should take place at at least the same speed as scanning the three picture lines.

Reconverting a picture coded in this manner can be done with an arrangement, shown in FIG. 3, which is inverse to the arrangement shown in FIG. 2. The signals produced at the output 17 in FIG. 2 are applied in FIG. 3 through an input 33 to a device 34 which checks the code words for the supporting positions for errors or corrects errors respectively by means of check bits, and thereafter re-converts all codewords by means of a dequantizing device into the original values produced by the processing circuits 8 and 10 of FIG. 2. As the successively produced, derived and decorrelated values respectively of a sub-picture should be present in parallel in the reconstruction they are each time intermediately stored. To that end the derived values of the supporting positions obtained again are applied through a switch-over switch 35 to a four-stage shift register 36 and entered by means of a series of four shift clock pulses at the shift clock pulse input 37 and thereafter the switch-over switch 35 is switched to a shift register 38 and the derived values of the intermediate elements are entered by means of five shift clock pulses at the shift clock pulse input 39 into this shift register.

The outputs of the shift register 36 are connected to a processing circuit 40 which recovers the original values of the supporting positions x1, x2, x3 and x4 and which may be constructed in a corrresponding manner as the processing circuit 8 of FIG. 2, the only difference being the use of other coefficients which are obtained from the inverse matrix. However, it is assumed for the processing circuit 40 that the values of the four supporting positions at the four parallel outputs are produced simultaneously, which can be accomplished for serially produced values by means of a series-to-parallel-converter disposed in the processing circuit 40 in the form of a shift register, for these four values should be provided in parallel in a processing circuit 42, four inputs of which are connected to the outputs of the processing circuit 40. In addition, the outputs of the processing circuit 40 are connected to parallel inputs of such stages of shift registers 44, 45 and 46 that herein the position of the values of the supporting positions corresponds with the position in the shift registers 2, 4 and 6 in FIG. 2. If the shift register stages of the shift registers 44, 45 and 46 can be entered individually, the values of the supporting positions can also be produced successively in the processing circuit 40 and distributed successively by a demultiplexer over the four outputs and entered into the shift register stages, it being possible for the corresponding four inputs of the processing circuit 42 to be connected to the outputs of these shift register stages.

The outputs of the shift register 38 are connected to the further inputs of the processing circuit 42 which recovers the original values of the intermediate elements and which may have been construed in the same manner as the processing circuit 10 in FIG. 2, however, with the corresponding other inverse coefficients. The same applies for the outputs of this processing circuit as for the outputs of the processing circuit 40, namely that when serially producing the values of the intermediate elements in the processing circuit 42 a series-to-parallel convertor is available which produces the values of the intermediate elements at the outputs of the processing circuit 42 in parallel so that they can be entered, for example, simultaneously with the values of the supporting positions, into the stages of the shift registers 44, 45 and 46 connected thereto or a demultiplexer is provided in the processing circuit 42 and the values successively appearing at the outputs of the intermediate elements are successively entered into these shift register stages. Controlling the series-to-parallel convertor and demultiplexers respectively is doen by means of clock signals at the inputs 41 and 43 respectively, which signals are supplied by the outputs, having the same reference numeral, of a clock-pulse control device 48 wherein clock-pulses of a clock-pulse generator 47 are supplied in the required sequence, for example by means of counting circuits. This clock-pulse control device 48 also supplies the write control clock pulses to the input 49 of the shift registers 44, 45 and 46 and also supplies the shift clock-pulses required after the complete recovery of the values of a sub-picture to the shift clock-pulse inputs 37 and 39 of the shift registers 36 and 38 respectively for taking over the values to be reconverted of the next sub-picture.

If the recovered picture must be supplied line-by-line, each shift register 44, 45 and 46 must have the capacity of an entire picture line so that they can be read successively after recovery or an entire line of sub-pictures.

The processing circuits 8 and 10 of FIG. 2 and 40 and 42 of FIG. 3 respectively can be construed in various simple manners as the values present at the inputs and the derived values respectively of the supporting positions need only be multiplied by different coefficients and the products thus obtained and, in the case of processing circuits 40 and 42, also the values present at the remaining inputs must be added in a corresponding manner. So the processing circuits 8 and 10 and 40 and 42 respectively must comprise multipliers, adding circuits and coefficient stores for multi-digit binary numbers which are known in the art. As, however, especially amplifiers for multi-figure binary numbers are somewhat more expensive, it is efficient, if the processing speed allows, this to use the lowest possible number of multipliers and to supply the output values serially.

FIG. 4a shows an example of the processing circuit 8 and 40 respectively. The drawing shows four multipliers 50, 52, 54 and 55, each for multi-digit binary numbers, to one input of which the values to be processed of the supporting positions are supplied. The other inputs of the multipliers receive the coefficients from the store 60, which is here shown in the form of a shift register. This shift register comprises, for example, the coefficients of the matrix shown in FIG. 3b, and that column-by-column. Consequently, the coefficients of the first lines of the matrix are offered at the same moment to the multipliers 50 to 56. The products at the outputs of the multipliers are supplied to the adder 58 which then supplies the derived value of the first supporting position at its output. Thereafter the shift register 60 receives a shift pulse through the input 22 and consequently the coefficients of the second matrix line are supplied to the multipliers 50 to 56 etc. The circuit of the shift register 60 is closed so that the information appearing at the end is again entered into the input and is not lost as the coefficients are constantly required again. In this manner the processed values, that is to say the derived values of the supporting positions successively appear at the output of the adder 58. With the processing circuit 8 in FIG. 2 these values are processed further in serial form, whilst in the processing circuit 40 in FIG. 3, as already described, the series input must be connected to a series-to-parallel convertor or a demultiplexer. After processing of the four supporting positions it must be ensured for the structure shown in FIG. 4a of the processing circuit, by means of additional shift pulses at the input 22 and 41 respectively, that the content of the shift register 60 again assumes the original position, either by means of a correspondingly great number of opposite shift clock-pulses or, if the shift register has only one shift direction by the supply of twelve additional shift clock-pulses to complete a full cycle.

As, normally, the coefficients are formed by multi-digit binary numbers, each shift register stage of the shift register 60 must comprise several storage stages. To reduce the cost of this shift register for given instructions for the coefficients in the matrix, as, for example, shown in FIG. 5b, the shift register can be constructed in the manner shown in FIG. 5a, where the shift-register 60 has only four stages 70, 72, 74 and 76 which each store a multi-digit binary number. The coefficients are first stored in the stages in accordance with the distribution indicated in the first matrix line of FIG. 5b. In the position shown of the switches 80, 82, 84 and 86 the stages contain the coefficients distributed as shown in the second matrix line. Then the switches 80, 82, 84 and 86 are switched-over to the opposite position and after the second shift clock-pulse at the input 22 the stages 70, 72, 74 and 76 contain the coefficients in the distribution shown in the third matrix line. Then the switches 80, 82, 84 and 86 are again switched back to the position shown in the drawing and after the third shift clock-pulse at the input 22 the coefficients are distributed in accordance with the fourth matrix line. If thereafter the switches 80, 82, 84 and 86 are again switched to the opposite position, the original distribution of the coefficients has been achieved again after the fourth shift clock-pulse at the input 22. The switching signal for the switches 80, 82, 84 and 86 can also be produced by the clock-pulse control device 32.

An example of a processing circuit 10 for decorrelating the intermediate values x5, x6, x7, x8 and x9 is shown in FIG. 6. This Figure includes an adder stage 90 which each time adds the values of two of the supporting positions x1, x2, x3, and x4. This adder stage 90 is arranged as well as a further adder stage 93, a subtracting stage 92 as well as 95 and multipliers 91 and 94 for processing multi-digit binary numbers. The sum of the values of the two supporting positions supplied by the adder stage 90 is applied to the multiplier 91 which multiplies this sum by a coefficient b1. As stated already the horizontal and vertical correlation coefficients of the supporting positions may be assumed to be equal without a gross error so that the coefficient b1 of the multiplier 91 has always the same value.

The output signal of the multiplier 91 whose value is the prediction value for the corresponding intermediate element is applied to the positive input of the subtracting stage 92 whose subtracting input is supplied with the signal of the corresponding intermediate element (x5, x6, x8 or x9). The relation between the connection of the supporting position x1, x2, x3 and x4, whose values are connected to the inputs which are indicated in the same manner and the intermediate elements x5, x6, x8 and x9 whose values are also applied to the inputs indicated in the same manner is achieved by controlling switches 98, 99 and 100 through a decoder 97. This decoder 97 is connected to a counter 96 which is supplied with the clock signals located at the input 24 and produced by the clock-pulse control device 32 of FIG. 2 by way of counting clock-pulse. The switches 98 and 99 whose positions are coupled, as shown by the dotted line in FIG. 6, and which are implemented in an efficient manner, as the remaining switch-over switches as semiconductor switches, are switched one position further at each clock signal at the inputs 24 and then start again at the first position, whereas the switch 100 switches at each second clock signal. This causes the proper computation instruction for supplying the difference values of the intermediate elements x5, x6, x8 and x9 to be performed. To simplify the control the difference value for the central intermediate element x7 is formed at the end of the cycle if the sequence of generating the difference value for the intermediate elements is not important and the same, altered sequence is maintained during the reconstruction.

To obtain the central intermediate element x7 the values of all four supporting positions x1, x2, x3 and x4 are added in the adding device 93 and the result is applied to the multiplier 94 which multiplies the sum by the coefficient b2. The output of the multiplier 94 is connected to the positive input of the subtracting stage 95 whose subtracting input is supplied with the value of the intermediate element x7. The output of the subtracting stages 92 and 95 are connected to the output of the processing circuit 10 through a switch-over switch 101. This switch 101 is also controlled by the decoder 97 which, for example during four clock signals applied to the input 24, maintains the switch 101 in the position shown until the difference values for the intermediate elements x5, x6, x8 and x9 have been obtained and which then switches over to the opposite position so that the difference value for the intermediate element x7 appears at the output.

As the output of the switch 101, that is to say the output of the processing circuit 10, leads to the switch-over switch 26 as shown in FIG. 2, the two switches 101 and 26 can be combined to one three-position switch.

The circuit 10 shown in FIG. 6 can also be changed such that for obtaining the difference value for the intermediate element x7, the input of the multiplier 91 connected to the adder stage 90 is switched to the output of the adder stage 93, and the switch 99 is provided with a fifth input through which the value of the intermediate element x7 is applied. Then the switch 101 can be dispensed with, as then the output of the subtracting stage 92 directly constitutes the output of the processing circuit 10.

What is claimed is:

1. A method for the redundancy-reducing coding of values of picture elements of pictures which are scanned line-by-line, said method comprising dividing said picture into a matrix of lines and picture elements, transmitting at least for a part of the picture elements the difference value between the actual value of a picture element and a predictive value obtained from the values of other picture elements, said dividing step comprising dividing the picture matrix into adjacent equal sized square sub-pictures, immediately storing the values of the picture elements of the picture lines which are covered by a row of sub-picture, processing in each sub-picture a number of picture elements which are distributed substantially uniformly over the sub-picture by transforming as supporting positions for themselves or by decorrelating by predictive difference formation, determining for each of the remaining intermediate elements a prediction value only from supporting positions of associated sub-picture, forming the difference value between this value and the actual value of the intermediate element, quantizing the transformed values and the difference values respectively, and adding check characters at least to the code word and the code words respectively for the supporting positions.

2. A method as claimed in claim 1, further comprising providing the supporting positions in the sub-picture such that each intermediate element in the horizontal, vertical, or diagonal direction is located directly between two supporting positions of a sub-picture.

3. A method as claimed in claim 1, wherein said processing step comprises said decorrelating the supporting positions by predictive difference formation step, wherein for obtaining the difference values the step of multiplying the values of the supporting positions by sets of coefficients which are the same for the complete picture is used, and adding the products.

4. A method as claimed in claim 1, wherein for obtaining the difference value for each intermediate value the step of multiplying the values of the adjacent supporting positions by sets of coefficients which are equal for the complete picture is used, and adding the products as well as the value of the intermediate element itself.

5. A method as claimed in claim 4, wherein the coefficients for all intermediate elements at horizontal, vertical, or adjacent supporting positions are equal.

6. An arrangement for the redundancy-reducing coding of values of picture elements of pictures which are scanned line-by-line, said arrangement comprising means for dividing said picture into a matrix of lines and picture elements, means for transmitting at least for a part of the picture elements the difference value between the actual value of a picture element and a predictive value obtained from the values of other picture elements, said dividing means comprising means for dividing the picture matrix into adjacent equal sized square sub-pictures, means for intermediately storing the values of the picture elements of the picture lines which are covered by a row of sub-pictures, means for processing in each sub-picture a number of picture elements which are distributed substantially uniformly over the sub-picture including means for transforming as supporting positions for themselves or means for decorrelating by predictive difference formation, means for determining for each of the remaining intermediate elements a prediction value only from supporting positions of associated sub-picture, means for forming the difference value between this value and the actual value of the intermediate element, means for quantizing the transformed values and the difference values respectively, and means for adding check characters at least to the code word and the code words respectively for the supporting positions.

7. An arrangement as claimed in claim 6, wherein said storing means comprises a number of shift registers equal to the number of lines of the given sub-pictures, wherein each of said registers stores the values of all picture elements of one picture line and has stages, said processing means comprising a first processing circuit means for producing the transformed values and the difference values of the supporting positions respectively coupled to outputs of the stages containing the values of the supporting positions of the sub-pictures which were stored last in the shift register, and a second processing circuit coupled to said outputs and having further inputs coupled to stages of the shift registers containing the values of the remaining picture elements of the last sub-picture, a switch over switch means for alternatingly coupling to the outputs of the processing circuits, said quantizing circuit being coupled to said switch means, said adding means being coupled to said quantizing circuit, and a clock-pulse control device means for supplying after processing of all picture elements of a sub-picture a number of shift clock pulses corresponding to the number of lines of the sub-picture to shift clock-pulse inputs of said processing circuits.

8. An arrangement as claimed in claim 7, wherein the second processing circuit comprises a first adder stage, switch over switching means for successively coupling inputs of said adder stage to various combinations of the outputs of two of said shift register stages comprising the supporting positions, a first multiplier having an input coupled to the first adder stage and a multiplying input coupled to receive a fixed value, a first subtracting stage having a positive input coupled to said first multiplier output and a substracting input, a further switch over switch means for successively coupling said subtracting input to the outputs of the shift register stages which contain the corresponding intermediate values, a second adder stage having inputs coupled to the outputs of the shift register stages which contain the values of the four supporting positions directly adjoining an intermediate element and an output, a second multiplier having an input coupled to said second adder output, a second subtracting stage having a positive input coupled to the multiplier output and a subtracting input coupled to receive the value of the corresponding intermediate element and a switch over switch coupled to the outputs of the two subtracting stages and to the output of the second processing circuit.

9. An arrangement as claimed in claim 7, wherein the first processing circuit comprises a store means for storing coefficient values, a plurality of multipliers coupled the store means and to the inputs of the processing circuit, and an adder circuit for each of a group of multipliers, the number of said multipliers corresponding to the number of supporting positions a sub-picture contains, which adder circuit adds the output values produced by the multipliers with the correct sign.

10. An arrangement as claimd in claim 9, wherein the store means comprises a shift register, said group of multipliers and a group of adders each are one in number, the multipliers being coupled to stages of the shift register selected that a different set of coefficient values is applied to the multipliers after each shift clock-pulse so that the adder sequentially supplies the various values of a sub-picture.

* * * * *